(12) United States Patent
Morgan

(10) Patent No.: US 9,803,537 B2
(45) Date of Patent: Oct. 31, 2017

(54) TURBO VORTEX PISTON

(71) Applicant: Kenneth Howard Morgan, Dallas, TX (US)

(72) Inventor: Kenneth Howard Morgan, Dallas, TX (US)

(*) Notice: Subject to any disclaimer, the term of this patent is extended or adjusted under 35 U.S.C. 154(b) by 0 days.

(21) Appl. No.: 13/999,648

(22) Filed: Mar. 15, 2014

(65) Prior Publication Data

US 2015/0260081 A1   Sep. 17, 2015

(51) Int. Cl.
| | |
|---|---|
| *F02F 3/00* | (2006.01) |
| *F02B 23/06* | (2006.01) |
| *F02B 23/08* | (2006.01) |
| *F02F 3/24* | (2006.01) |
| *F02F 3/28* | (2006.01) |
| *F02B 3/06* | (2006.01) |
| *F02F 3/22* | (2006.01) |
| *F02B 23/10* | (2006.01) |

(52) U.S. Cl.
CPC .......... *F02B 23/0627* (2013.01); *F02B 23/08* (2013.01); *F02F 3/24* (2013.01); *F02F 3/28* (2013.01); *F02B 3/06* (2013.01); *F02B 2023/108* (2013.01); *F02F 3/00* (2013.01); *F02F 3/22* (2013.01); *F05C 2201/021* (2013.01); *F05C 2201/0448* (2013.01); *Y02T 10/125* (2013.01)

(58) Field of Classification Search
CPC ........ F05C 2201/021; F05C 2201/0448; F02F 3/22; F02F 3/00; F02B 3/06
USPC .................................................. 123/193.6
See application file for complete search history.

(56) References Cited

U.S. PATENT DOCUMENTS

| | | | | |
|---|---|---|---|---|
| 5,103,784 A | * | 4/1992 | Evans | F02B 23/08 |
| | | | | 123/263 |
| 5,617,823 A | * | 4/1997 | Gray, Jr. | F02B 23/101 |
| | | | | 123/254 |
| 2007/0261658 A1 | * | 11/2007 | Abe | F16J 1/09 |
| | | | | 123/193.6 |

* cited by examiner

*Primary Examiner* — Jacob Amick
*Assistant Examiner* — Charles Brauch
(74) *Attorney, Agent, or Firm* — Law Office of Jeff Williams; J. Oliver Williams

(57) ABSTRACT

A piston for use in 4 Cycle reciprocating Internal Combustion Engines. The one embodiment includes a multifunctional Engraving or Imprint that is machined into the crown of the piston. This "Imprint" consists of concentric circles of metal removed in a machining process resulting in the compartments of the functional areas within the crown of the piston connected by either the height and or cross drillings within the Imprint. The functional result is to create low and high pressure zones within the crown of the piston as it proceeds upward on the compression stroke facilitating the creation of an active moving rotational swirl in the outer 25% on the top surface area of the piston circumference. The active swirl pattern results in ultimate homogenization of the air fuel mixture leaving no area of the combustion chamber with weak or separated air and fuel molecules resulting in enhanced power and complete combustion.

11 Claims, 3 Drawing Sheets

TURBO VORTEX PISTON

CROSS REFERENCE TO RELATED APPLICATIONS

This application claims priority over U.S. Provisional Patent Application No. 61/802,617 filed Mar. 16, 2013 and entitled "Turbo Vortex Piston" the disclosure of which is incorporated herein in its entirety

BACKGROUND OF THE INVENTION

The existing configurations of reciprocating internal combustion engines are comprised of a piston moving up and down within a cylinder or several cylinders incorporated within a block assembly. Said block has a cylinder head, which encompasses an intake and exhaust valve for the insertion of fuel and removal of the spent exhaust gases after combustion. This assembly also referred to as an internal combustion engine operates with four cycles defined as; Intake, Compression, Power and Exhaust—each function of which occurs in one-half turn increments of a rotating crankshaft that takes the movement of the pistons up and down movements and converts them to a rotation shaft making this power usable for today's automotive vehicles and powering machinery.

Current existing designs of internal combustion mix the air/fuel mixture by virtue of the "swoosh" and "squish" of the piston moving as it approaches the top of the compression stroke. The piston either causes the air/fuel mixture to move around based on the shape of the top of the piston (swoosh) or as the piston reaches the top of the reciprocating stroke squeezing the air/fuel mixture between the top of the piston and the cylinder head (squish). The problem with existing designs to date is they are inefficient because they are usually flat on top or a dish that is aerodynamically foiled both in their ability to homogenize fuel and the ultimate problematic deficiency that results in detonation or premature combustion of the air/fuel mixture. This results in premature burning of the air/fuel mixture using up the fuel charge while resulting in no production of power but further that the premature ignition of the air/fuel mixture can oppose the upward stroke of the piston on the compression stroke thereby lowering the producible power of the engine when the piston finally rolls over into the power stroke.

There are several factors that affect the efficiency of the internal combustion engine. Size of the engine, number of cylinders, available amount of the fuel source, size and efficiency of the exhaust system attached to the engine. All of these are able to be changed and effected from the outside of the engine.

After these things are established and perfected the only other platform to modify is the internal components and processes. Historically, the internal combustion engine design has remained pretty consistent with only relatively minor internal changes. The most prevailing modifications over the years has been to camshafts lift and duration, increasing bore and stroke, types and sizes of intake and exhaust valves, shapes of cylinder head combustion chambers and lastly use of valve lifter types and apparatus.

Most recently, the next frontier is into atomization and homogenization of the fuel mixture, increasing the amount of air and pressure that gets into the cylinder and clearing exhaust out of the engine. These items together speak to increases to efficiency but current internal changes to date have had minimal result.

BRIEF SUMMARY OF THE INVENTION

Within the problematic deficiencies of the internal combustion engine, the objectives of the invention are to realize increased efficiency of the internal combustion engine through total homogenization of the air/fuel mixture, increasing power and efficiency while achieving both cessation of detonation and lowering of emissions through a more perfected combustion process.

It is the objective of the current embodiment of the invention to increase internal combustion engine efficiency.

It is also an object that higher static compression ratios can be utilized to increase efficiency.

Another objective of the invention is to create improved Dynamic Compression Ratio further increasing efficiency.

It is also this Dynamic Compression Ratio is also variable and increases with engine speed further adding to exponentially increase engine efficiency without detonation.

Another objective of the invention is that the variable Dynamic Compression Ratio serves to produce a higher and more linear torque curve thereby increasing efficiency through more producible horsepower.

Another objective of the invention is the Active, Bilateral Swirl produced by the current embodiment of the invention produces more power as this swirl is at higher pressures and combustion temperatures which produces more horsepower and efficiency.

It is also an object that the Swirl mixes and fully homogenizes the air/fuel mixture for better flammability and efficiency.

It is also an object of the invention that fully homogenized fuel burns completely and creates perfect cylinder balance.

It is also an object that better homogenization of the air/fuel mixture results in lower emissions.

Another objective of the invention is that as the air/fuel mixture passes through the Vortex jets it shears any fuel droplets into a perfectly atomized and efficient fuel source that is virtually totally homogenized as it enters into the swirl chamber.

Another objective of the invention is the active swirl pressurizes the exhaust stroke forcing more exhaust gases out of the combustion chamber clearing out the now spent fuel charge.

It also produces a low pressure area as the intake valve opens on overlap suitable to act as a vacuum capable of pulling a larger fuel charge into the engine on the intake stroke.

Figure 1:
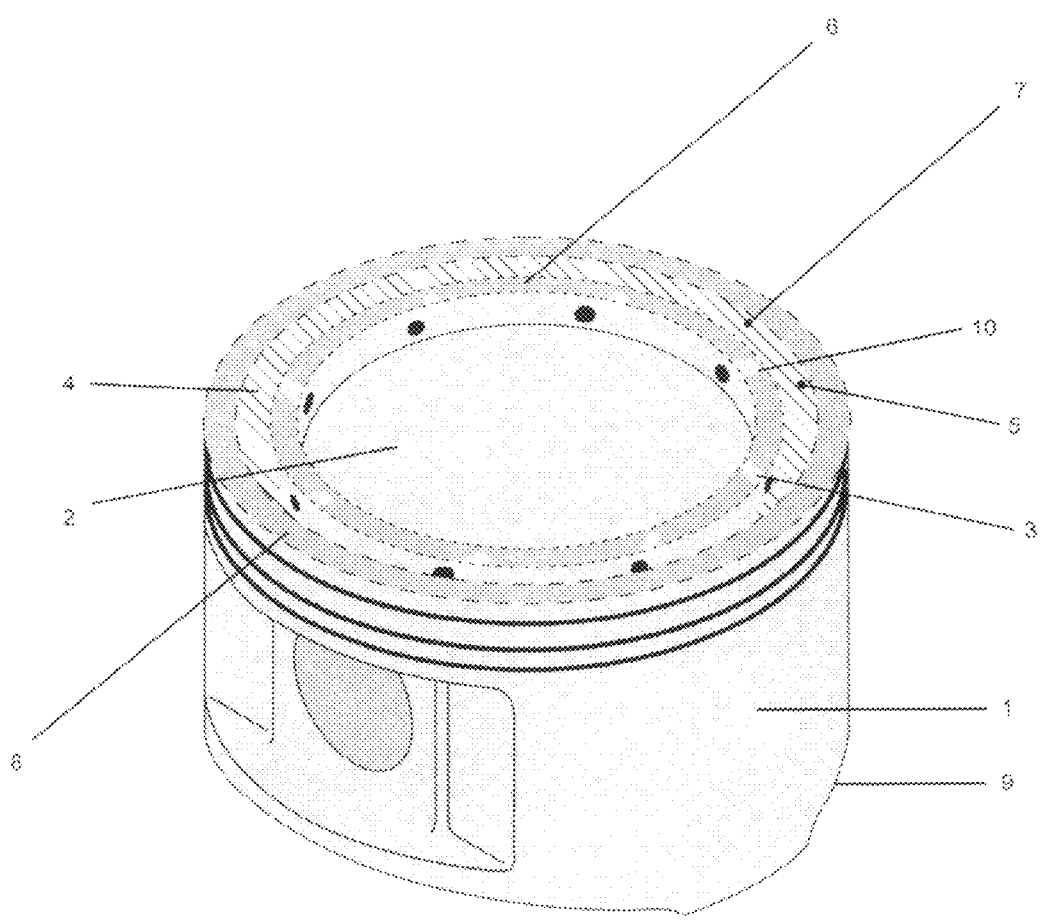
FIG. 1 is a cross sectional perspective view of the current preferred embodiment of the invention.
Figure 2:
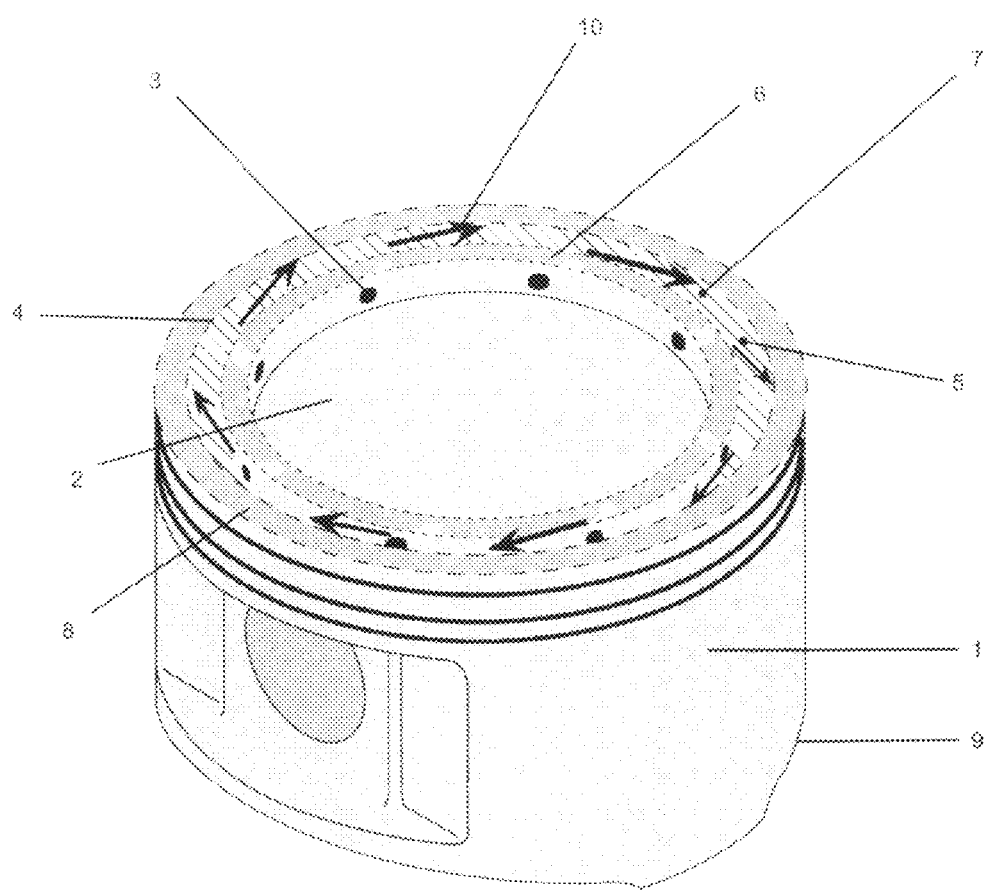
FIG. 2 is a cross sectional view with the same perspective view as FIG. 1 with the addition of showing the embodiment of the indicated direction of the swirl rotation function of the invention.
Figure 3:
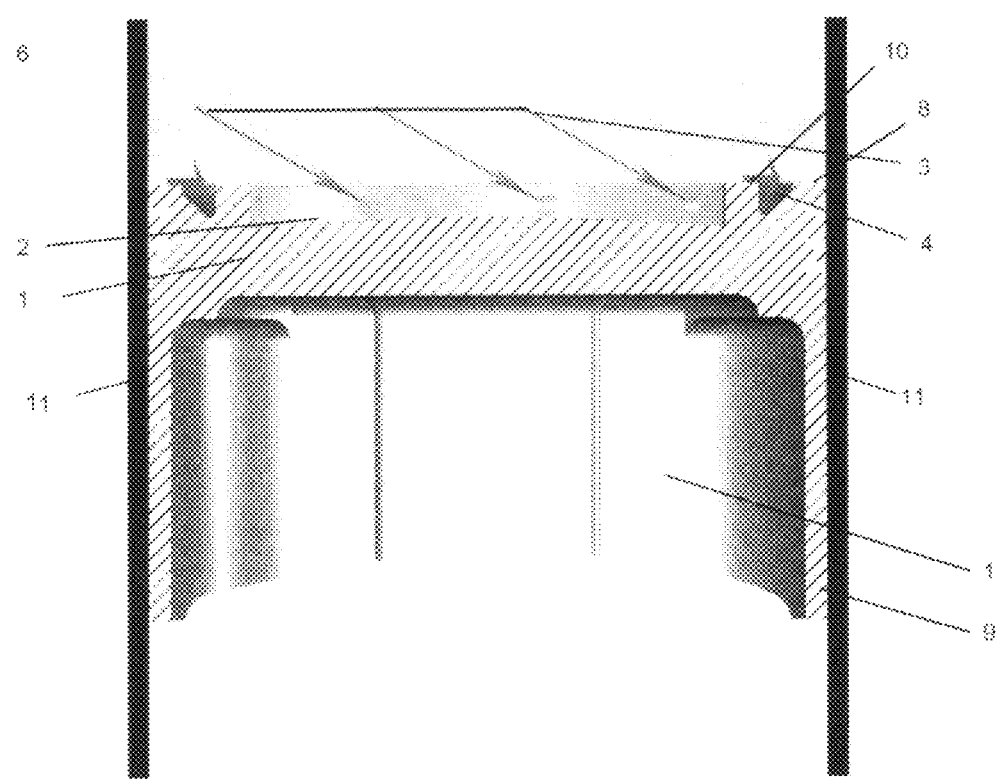
FIG. 3 is a side cross sectional view of the piston in the cylinder for the current embodied the invention in FIG. 1.

Reference to Figure notations;
No. 1—Said embodiment of the Piston
No. 2—Center Plenum of the piston crown
No. 3—Vortex jet
No. 4—Swirl Chamber
No. 5—Identification of a "high pressure" area of the swirl chamber
No. 6—Internal wall of the piston crown
No. 7—Identification of a "low pressure" area of the swirl chamber
No. 8—Outer wall of the piston crown
No. 9—Identification of the side of the embodiment of the piston
No. 10—Arrow indicators showing direction of airflow in the swirl chamber No. 11—Representation of the cylinder wall that the piston reciprocates within

DETAILED DESCRIPTION OF THE INVENTION

As the current embodiment of the piston 1 begins on the travel upward on the compression stroke, the air/fuel mixture while being compressed is presented to the center plenum 2 of the Piston. This air/fuel mixture is then forced through the Vortex jets 3 from the center of the Piston plenum 2 into the outer swirl chamber 4. Important here to take note, that the compression that is applied to the center plenum 2 is also applied to the whole top surface of the machined "imprint" in the piston crown which incorporates 2,3,4,6,7,8. Therefore as the air/fuel mixture that is being passed through the vortex jets 3 into the swirl chamber 4 and is contained in part by the compression pressure keeping it forced down against the piston crown 2,3,4,6,7,8 and also by the low pressure zones that occur naturally at the leading edge of each Vortex jet 7. Anytime high pressure is passing through a small orifice 3 a resultant low pressure area is created just in front of it 7.

The holes machined for the Vortex jets 3 in the production process after the "imprint" is machined into what is the complete crown of the piston 2,3,4,6,7,8 are directed at such an angle in relation to the radius of the swirl chamber 4 thereby starting the swirl pattern in an indicated clockwise direction 10. This, coupled with the low pressure zone 7 at the leading edge of each Vortex jet 3 sets the rotation direction 10, holds it down in place by being a draw to the high pressure area 5 from the previous jet in rotation and with the downward force of compression on the pistons' upward stroke forms the pump action that starts the vortex swirl 10 in motion and accelerating. This with the addition of the outer swirl pattern 10 being pressed down at the moment of squish when the piston reaches TDC (top dead center), along with the inner air already present at the center plenum 2, spins the air in the center plenum 2 faster by virtue of frictional drive from the swirl chamber 4 which is afforded by the "Coanda effect" where the hot air of combustion remains grouped with the air foil and creating a multiplication of fluid pressure dynamics somewhat akin to the whole circular loop effect of the exhaust and intake impellors of a turbo chargers operation.

The properties of fluid dynamics, forces the efficiency of taking the air/fuel mixture presented to the center plenum 2 and passing through the vortex jets 3 into the high and low pressurized circulating vortex 5,7,10 results in the multiplication of pressure across the outer 25% circumference of the top of the piston crown 6,7,8. Operating much similar to the use of "Bernoulli's Principle" in the shape of an aircraft wing that creates lift, the angles cut at the bottom sections of the Swirl chamber 4 direct, contain, maintain and form the High Pressure Swirl 10 that is generated in the outer 25% surface of the piston crown "Imprint" 6,7,8 that is machined into the piston at the time of manufacture.

Furthermore, the fluid dynamics in the feed of the amount of air in the larger center plenum 2 pressurizing the smaller swirl chamber 4 multiplies to create the high pressure and forms this higher "Boost" in pressure upon ignition in the swirl chamber 4 across the whole outer circumference of the crown of the piston 6,7,8 that results in the increased power created by the current embodiment of the piston 1.

During the compression stroke the piston 1 moves up creating the compression of the internal combustion engine as well as the commencement of the swirl process 10. At the top of the stroke the spark plug fires the air/fuel mixture first in the center plenum 2 and subsequently several milliseconds after and delayed in the swirl chamber area 4 because of the higher dynamic pressures being generated in the swirl chamber 4 and the outer 25% crown of the piston 6,7,8—effectively increasing power with ignition of the higher dynamic pressure of the air/fuel mixture in the swirl chamber 4 delayed and additionally reducing detonation as a result of the delayed air/fuel mixture timing of ignition as a result of the higher pressures realized in the swirl chamber 4. Concurrently and effectively, the high pressure swirl 10 effectively shears detonation shock waves directed at the crown of the piston, virtually eliminating detonation as a direct result of the high speed swirl 10.

Referencing Loth, U.S. Pat. No. 8,656,957 the high pressure swirl chamber 4 acts to create a vortex generator that effectively brings cessation of detonation and Babinsky, Loth, Lee U.S. Pat. No. 6,651,935—the discussion concerning cessation of detonation within aerodynamic boundary layers similar to those utilized within the shape of the inner and outer walls 6 and 8 and the substrate of the floor of the plenum 2 and the swirl chamber 4 within the current embodiment of the invention.

After combustion occurs and the end of the power stroke the piston reciprocates upward into the exhaust stroke. Combustion inefficiencies occur when all of the exhaust gases cannot exit the cylinder chamber resulting in recycled exhaust gases that are not flammable left in the cylinder into the next reciprocating stroke. This "EGR" (exhaust gas recirculation) is internally generated causing reduction of space available for a fresh air/fuel mixture charge.

Further increasing power the current embodiment of the piston once again develops a pressurized swirl in the swirl chamber on the exhaust stroke that aligns itself with the exhaust valve in the cylinder head and forces the exhaust gases out under the expanded pressure of the fully rotational swirl. Finally, as the exhaust valve closes and the intake valve opens and the piston starts downward the remaining swirl that exists in the center plenum acts like a low pressure vacuum region that effectively sucks additional new air/fuel mixture charge into the cylinder, once again commencing the 4 stroke reciprocating process but with more pure air/fuel mixture charge to ignite.

It may be indicated here that differences within the height, depth, or diameter embodiment of the piston itself or of the various components of the piston crown and "imprint" may occur as a result of compatibility during construction or use of different types of internal combustion engines without taking away from the spirit of the embodiment of the invention.

Reference to several patents; Erlandson—U.S. Pat. No. 8,528,514, Evans—U.S. Pat. No. 5,065,715, McFarland U.S. Pat. No. 6,170,454, Lampardi U.S. Pat. No. 4,063,537, Wirth et al U.S. Pat. No. 6,047,592, severally and individually show uses of a reciprocating piston design used for the internal combustion engine utilizing swish and swoosh to mix the air/fuel mixture, In the current embodiment of the invention, the plurality of the process to swirl the air/fuel mixture increases the ability to maximize homogeneity, create the fluid dynamic increase in pressure coupled with the speed and force of the swirl to create cessation of detonation therein form more than various eddies or currents but serve to maximize air/fuel mixture movement and counter the negative aspects of combustion within the reciprocating internal combustion engine.

PATENT CITATIONS

| Patent Reference | Filing date | Publication date | Applicant | |
|---|---|---|---|---|
| U.S. Pat. No. 8,528,514 | Aug. 7, 2012 | Sep. 10, 2013 | Erlandson | Piston for reciprocating |
| U.S. Pat. No. 6,170,454 | Jul. 31, 1998 | Jan. 9, 2001 | McFarland | Piston Apparatus |
| U.S. Pat. No. 5,065,715 | Feb. 7, 1990 | Nov. 19, 1991 | Evans | Squish jet Combustion |
| U.S. Pat. No. 4,063,537 | Feb. 24, 1976 | Dec. 20, 1977 | Lampardi | Combustion chamber |
| U.S. Pat. No. 6,047,592 | Mar. 31, 1997 | Apr. 11, 2000 | Piock, Wirth | Four Stroke Internal |
| U.S. Pat. No. 3,960,119 | Dec. 17, 1974 | Jun. 1, 1976 | Dimitracopoulos | Internal Combustion |
| U.S. Pat. No. 8,656,957 | Sep. 30, 2010 | Feb. 25, 2014 | Babinsky, Loth | Vortex Generator Control |
| U.S. Pat. No. 6,651,935 | Jun. 12, 2002 | Nov. 25, 2003 | Loth | Vortex Generator Control |

The invention claimed is:

1. A piston comprising:
   a center plenum recessed in an upper surface of the piston;
   an inner wall adjacent the center plenum and configured to define the shape and bounds of the center plenum; and
   a swirl chamber recessed in the upper surface of the piston around the center plenum and inset from a side of the piston, the swirl chamber and the center plenum being separated by the inner wall, the inner wall configured to permit a passage of fluid between the center plenum and the swirl chamber, the swirl chamber being smaller in area than the center plenum;
   wherein an area defined by the inclusion of the center plenum, the inner wall, and the swirl chamber is referred to as a piston crown;
   wherein the fluid is configured to pass from the larger center plenum into the smaller swirl chamber as the fluid is compressed so as to generate an increased pressure upon the piston crown.

2. The piston of claim 1, wherein the inner wall includes a plurality of vortex jets bored through the inner wall, such that at least a portion of the vortex jet is encapsulated by the inner wall.

3. The piston of claim 1, wherein the inner wall includes a plurality of vortex jets bored through the inner wall at an angle relative to the radius of the piston.

4. The piston of claim 3, wherein the inner wall at least partially encapsulates the vortex jet.

5. The piston of claim 3, wherein w/in the angle of the vortex jets is configured to direct the flow of fluid from the center plenum radially around the circumference of the piston.

6. The piston of claim 3, wherein the fluid passing through the vortex jets contacts a surface of the swirl chamber and is directed in an upward and outward direction relative to the center plenum, the outer surface of the swirl chamber being sloped away from the center plenum.

7. The piston of claim 3, wherein the fluid passing through the vortex jets is configured to swirl around the circumference of the piston.

8. The piston of claim 7, wherein the fluid passing through the vortex jets is restricted to the swirl chamber, the swirl chamber accounting for an area of 25% of the piston.

9. The piston of claim 1, wherein the swirl chamber includes an inner surface along the inner wall and a sloped outer surface, the slope being non-parallel to the inner surface.

10. The piston of claim 9, wherein the slope of the outer surface is configured to direct fluid passing from the center plenum and into the swirl chamber in an upward direction away from the upper surface, and outer direction away from the center plenum, the sloped outer surface being linear and angled away from the center plenum.

11. The piston of claim 1, wherein the center plenum is circular.

* * * * *